Oct. 10, 1950     F. W. SEYBOLD     2,524,867
TRANSMISSION
Filed Oct. 23, 1946     5 Sheets-Sheet 3

| POSITION | | CLUTCH & BRAKE ENGAGEMENTS | | | | | TORQUES — ENGINE TORQUE = 100 | | | | | | | | OUT-PUT |
|---|---|---|---|---|---|---|---|---|---|---|---|---|---|---|---|
| RATIO | INV. RATIO | A | B | MEMBERS 41-53 | MEMBERS 35-53 | MEMBERS 31-51 | FLUID COUPLING | INTERNAL GEAR | MEMBERS 24-29-30-21-22-23 | A | B | MEMBERS 41-53 | MEMBERS 35-53 | MEMBERS 31-51 | |
| FOR FIGURE 1. | | | | | | | | | | | | | | | |
| EM.LOW .200 | 5:1 | ON | OFF | ON | OFF | OFF | 100 | — | — | 100 | — | 400 | — | — | 500 |
| LOW .3125 | 3.2:1 | OFF | OFF | ON | ON | OFF | 100 | 100 | 160 | — | — | 160 | 60 | — | 320 |
| 1.INT .500 | 2:1 | ON | OFF | OFF | ON | OFF | 100 | 167 | 267 | 67 | — | — | 100 | — | 200 |
| 2.INT .625 | 1.6:1 | OFF | ON | OFF | ON | OFF | 100 | 100 | 160 | — | 80 | — | 60 | — | 160 |
| HIGH 1.00 | 1:1 | ON | ON | OFF | OFF | OFF | 100 | — | 100 | 100 | 50 | — | — | — | 100 |
| REV .333 | 3:1 | ON | OFF | OFF | OFF | ON | 100 | — | 400 | 100 | — | — | — | 400 | 300 |
| — | 2 | 3 | 4 | 5 | 6 | 7 | 8 | 9 | 10 | 11 | 12 | 13 | 14 | 15 | 16 | 17 |
| FOR FIGURE 2. | | | | | | | | | | | | | | | |
| EM.LOW .200 | 5:1 | ON | OFF | ON | OFF | OFF | — | — | — | 100 | — | 400 | — | — | 500 |
| LOW .3125 | 3.2:1 | OFF | OFF | ON | ON | OFF | 100 | 100 | 160 | — | — | 160 | 60 | — | 320 |
| 1.INT .500 | 2:1 | ON | OFF | OFF | ON | OFF | 167 | 167 | 267 | 67 | — | — | 100 | — | 200 |
| 2.INT .625 | 1.6:1 | OFF | ON | OFF | ON | OFF | 100 | 100 | 160 | — | 80 | — | 60 | — | 160 |
| HIGH 1.00 | 1:1 | ON | ON | OFF | OFF | OFF | — | — | 100 | 100 | 50 | — | — | — | 100 |
| REV .333 | 3:1 | ON | OFF | OFF | OFF | ON | — | — | 400 | 100 | — | — | — | — | 300 |

Fig. 3

INVENTOR.
Frederick W. Seybold

INVENTOR.
Frederick W. Seybold

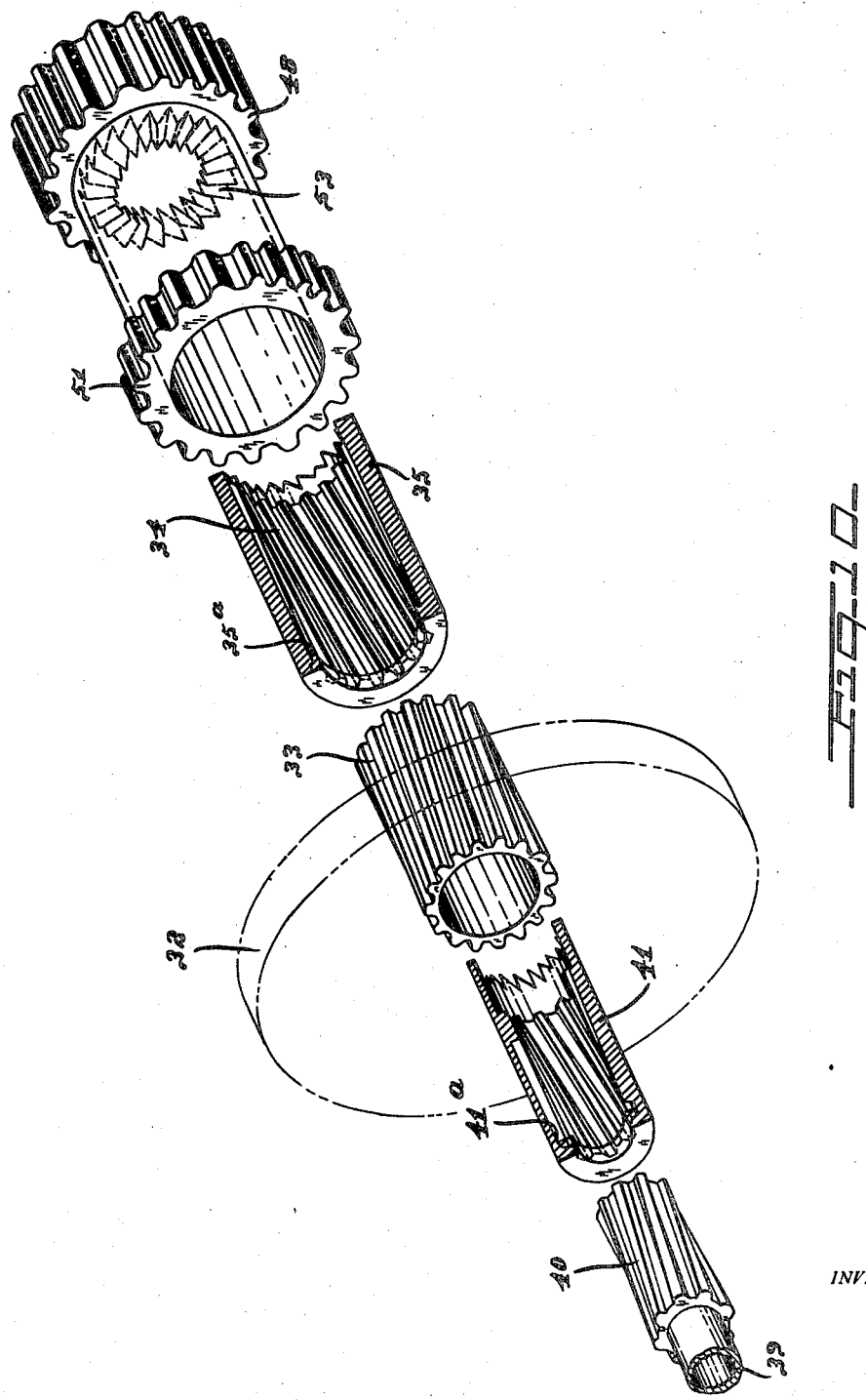

Patented Oct. 10, 1950

2,524,867

UNITED STATES PATENT OFFICE 2,524,867

TRANSMISSION

Frederick W. Seybold, Westfield, N. J.

Application October 23, 1946, Serial No. 705,062

20 Claims. (Cl. 74—730)

This invention relates to automatic variable speed gearing combined with a Föttinger fluid coupling for converting torque and is particularly adaptable for use on motor vehicles or any other mechanism with which variable speed transmissions are customarily employed.

Variable speed transmission gearing combined with a hydraulic coupling is well known in the art, but most of them are complex in operation as they require the controlled, alternate engagement and disengagement of clutches and brakes to produce the desired speed ratios and in some constructions a separate gear set must be provided solely to obtain the reverse operation of the transmission. In view of the fact that the torque reactions produced in such transmissions may be several times the input torque it becomes increasingly difficult to control these reactions by friction brake bands.

While in this invention the control of the clutches may be fully automatic, on the other it may be desirable to place the control of the clutches entirely in the hands of the operator and by means of a simple valve this feature becomes available.

It is a primary object of this invention to provide a power transmission in which the torque reactions are automatically controlled by positive jaw-type brakes which automatically are rendered inoperative when these torque reactions are relieved.

It is a further object to provide a power transmission in which a high torque multiplication is available under emergency conditions.

It is a still further object of this invention to provide a power transmission which produces five different forward speed ratios and one reverse speed ratio thru the alternate or combined engagement and/or disengagement of two friction clutches, which may be under manual or automatic control.

It is another object of this invention to provide a power transmission with suitable means to prevent "roll-back" of the vehicle when the transmission is conditioned for forward operation.

It is an additional object of this invention to provide means to prevent the output shaft from overrunning the input shaft.

A further object of this invention is to provide a power transmission in which the torques imposed on the friction clutches never exceed and are mostly less than the engine torque and the latter is transmitted in all speed ratios thru a fluid coupling whereby shocks are cushioned and smoothness of operation is attained.

With these and other objects in mind which will become apparent throughout the description the invention resides in the novel combination of planetary gearing, friction clutches and positive braking elements combined with a fluid coupling to produce the various features outlined above and hereinafter described and more particularly defined in the appended claims, it being understood that such changes in the precise embodiment of the invention may be made as come within the scope of the claims.

The accompanying drawings illustrate two examples of the invention constructed to demonstrate the principles of the invention to the best advantage; and in which:

Figure 3 shows in tabulation the various speed ratios, clutch and brake engagements, torque ratios for both constructions;

Figure 9 shows the various positions of the slidable brake member whereby the different speed ratios of the transmission are determined.

Figure 10 is an exploded view showing the externally grooved reaction members with their internally grooved, slideable brake means which cooperate with a slideably positioned stationary brake means.

Figure 1:
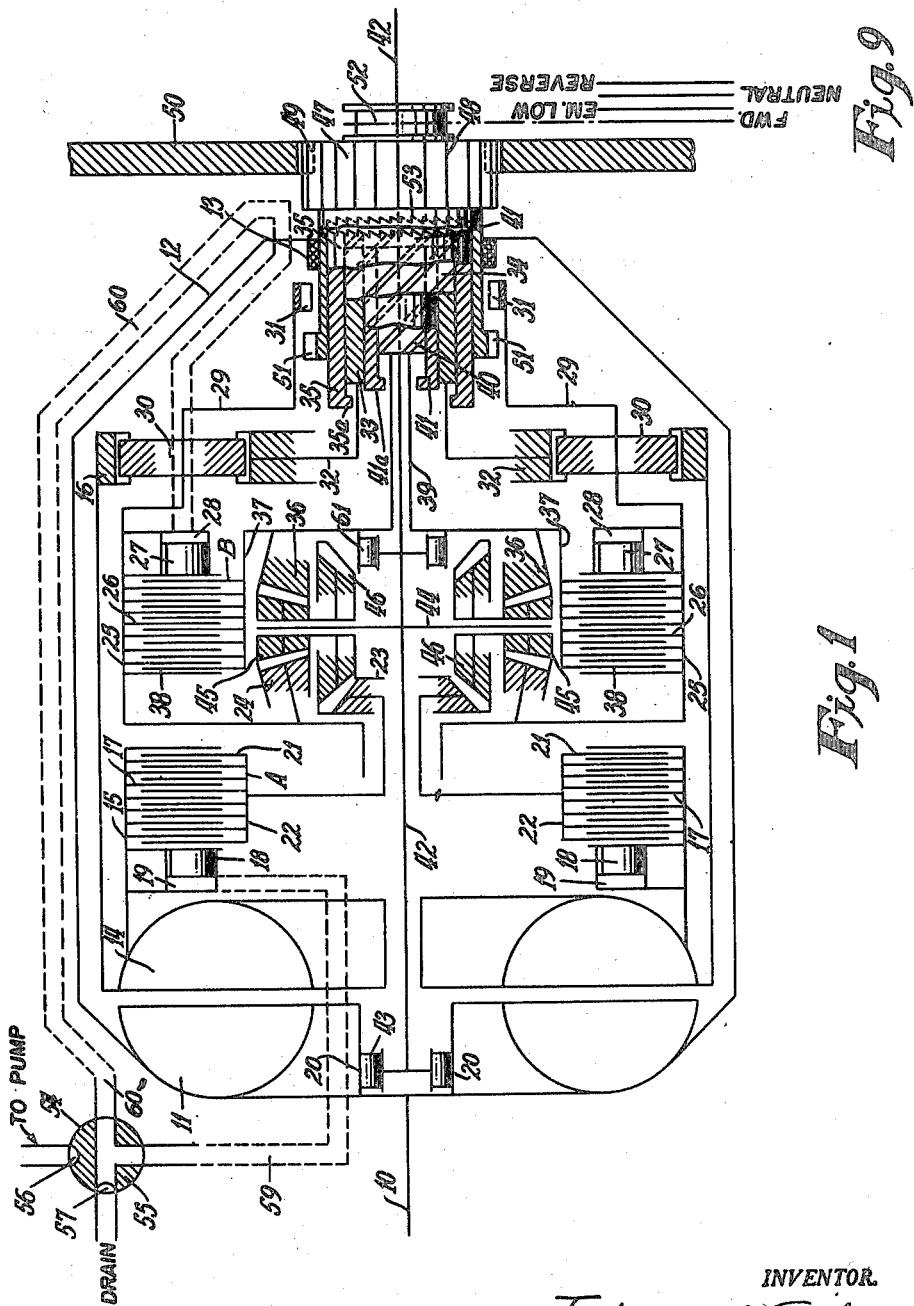
Figure 1 is a side elevational view in vertical longitudinal section thru the power transmission. All minor details such as anti-friction bearings, screws, etc. have purposely been omitted whereby a diagrammatic drawing lends itself to an easier understanding and comprehension of the construction of the invention.

Referring to Figure 1, the transmission unit is composed of eight assemblies to be hereinafter described in detail.

1. THE PRIMARY DRIVING ASSEMBLY

The primary driving assembly comprises the drive shaft 10 integral with the impeller 11 of a hydraulic coupling, and with the casing 12, which surrounds the entire transmission. An oil seal 13 confines the lubricating oils therein. A turbine wheel 14 co-operates with the impeller 11, and wheel 14 is connected to a clutch housing provided with an internal gear 15 and an internal gear 16, the internal gear 15 receiving the friction plates 17 of the multiple plate clutch A. Suitable hydraulic pressure operated pistons 18 in cylinders 19 are attached to the turbine wheel 14 for the actuation of the friction clutch A. A hardened steel ring 20 is part of the impeller 11 and this ring is a component part of a freewheeling clutch to be described later.

2. THE SECONDARY DRIVING ASSEMBLY

The secondary driving assembly comprises the friction plates 21 which alternate with the friction plates 17 and the former are slidably mounted on the external hub 22 to which the bevel gear 23 is attached.

3. THE INTERMEDIATE FLOATING ASSEMBLY

The intermediate floating assembly comprises the bevel gear 24, the member 25 for receiving the friction plates 26, the hydraulic pressure operated pistons 27 in cylinders 28 attached thereto and the carrier 29 on which the planet pinions 30 are mounted for engagement with the internal gear 16. The carrier 29 terminates with the internal brake teeth 31.

4. THE PRIMARY REACTION ASSEMBLY

The primary reaction assembly comprises the sun gear 32 which meshes with the planetary pinions 30. Sun gear 32 is provided with a hub 33 on the external surface of which multiple helical threads 34 are formed which are engaged by similar multiple helical threads formed within the bore of the multiple tooth brake 35. A shoulder 35a limits the movement of brake 35 to the right.

5. THE SECONDARY REACTION ASSEMBLY

The secondary reaction assembly comprises the bevel gear 36, the external hub 37 for receiving the friction plates 38 which together with the plates 26 form the multiple plate clutch B. Bevel gear 36 is provided with a hub 39 on the external surface of which multiple helical threads 40 are formed which are engaged by similar multiple helical threads formed within the bore of the multiple toothed brake 41. (The teeth of brakes 35 and 41 are in the same plane when in their disengaged position.)

The brake 41 fits snugly into hub 33 with only sufficient clearance for a film of oil the function of which will be described later. A shoulder 41a limits the movement of brake 41 to the right.

6. THE DRIVEN ASSEMBLY

The driven assembly comprises the output shaft 42 which extends to the left and there carries the overrunning clutch 43 which prevents the output shaft from overrunning the drive shaft 10, as well as for the purpose of starting the engine by pushing the car. To the output shaft 42 is attached the carrier 44 on which the cluster bevel pinions 45 and 46 freely rotate. Pinions 45 mesh with bevel gears 24 and 36, and pinions 46 mesh with bevel gear 23.

7. THE CONTROL ASSEMBLY

The control assembly comprises the slideable brake member 47, the position of which relative to the tooth brakes 31, 35 and 41 determines the various speed ratios which will be described later. Member 47 is provided with external spline teeth 48 which are slideably mounted in internal spline teeth 49 of the stationary transmission casing 50. The member 47 extends into the transmission casing 12 and provides a cylindrical surface for the oil seal 13 and at its extreme left it is provided with external brake teeth 51 which may be engaged with the brake teeth 31 when member 47 is moved to the right by means of well known shifting mechanism usually actuated by lever and linkage mechanism attached to the steering wheel column and terminating in the groove 52 of the member 47. The member 47 is provided with a bore for snugly fitting the brake 35 therein with only sufficient clearance for an oil film, the purpose therefor to be described later. The bore of member 47 terminates at the internal vertical face on which the radial, multiple tooth brake 53 is provided for engagement with the brakes 35 and 41 separately or simultaneously.

As previously mentioned the pistons 18 and 27 are actuated by hydraulic pressure to condition the multiple friction disc clutches A and B for the transmission of power. The source of this hydraulic pressure is usually a pump (not shown) whose high pressure fluid is conducted to the valve chamber 54 in which the 3-way valve 55 is rotatably fitted and provided with suitable drain grooves 56 and 57, the groove 57 co-operating with a drain groove 58 in the bore of the valve chamber 54 from which a duct 59 leads to the cylinder 19 of the clutch A and a similar duct 60 leads to the cylinder 28 of the clutch B. These ducts are diagrammatically indicated on Figure 1.

8. THE "NO-ROLL-BACK" ASSEMBLY

To prevent "roll-back" of the vehicle when the transmission is set in any one of the 5 forward gear ratios a one-way brake 61 is incorporated between the bevel gear 36 of the secondary reaction assembly and the shaft 42 of the driven assembly.

The construction of Figure 2 differs from that shown in Figure 1 in the following respect:

The internal member 15 of the multiple disc clutch A is now connected to the drive shaft 10 and the impeller 11 of the hydraulic coupling; but the casing 12 is now connected to the runner 14 of the hydraulic coupling. All parts hereby affected have been given reference numbers ten times larger than those of the corresponding parts of Figure 1.

OPERATION

A. *Idling or "neutral" position*

Figures 4, 5:
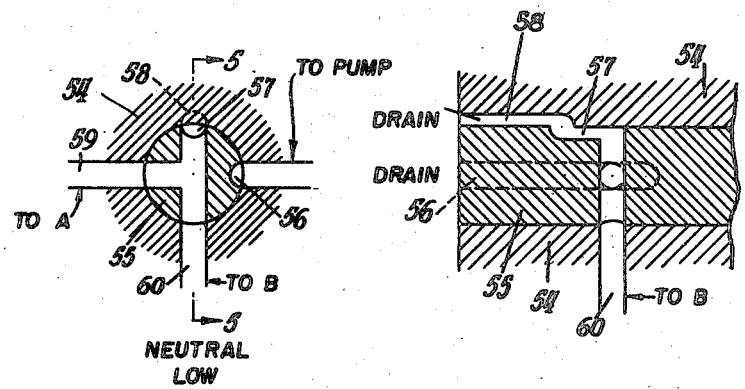
Figure 4 shows the valve setting for the operation of clutches A and B, when the transmission is operating in "Low" gear ratio.
Figure 5 is a cross-section taken along the line 5—5 of Figure 4.

For neutral operation of the transmission a suitable control lever in the steering wheel post will be set in the neutral position as indicated in Figure 9, thus sliding brake member 47 to the right from the position shown in Figure 1 to the extent that the teeth 51 and 31 approach each other but do not yet engage, and the brake teeth 53 will then be out of reach of the brake teeth 35 and 41, the movement of members 35 and 41 to the right being limited by the shoulders 35a and 41a respectively. The 3-way valve 55 is set as shown in Figure 4. The pressure fluid from the pump discharges into the groove 56 and the clutches A and B are disengaged, as no pressure is developed in cylinders 19 and 28, because they may drain thru the drain grooves 57 and 58. The driven shaft 42 being at rest will also bring to rest the bevel gears 23, 24 and 36 of the secondary driving assembly, the intermediate floating assembly and the secondary reaction assembly respectively. The impeller 11 will drive the runner 14 and the internal gear 16 at approximately the same speed and the sun gear 32 will be driven in the opposite direction at a speed determined by the ratio of the number of teeth in the internal gear 16 and the sun gear 32. For example, if the internal gear 16 has 80 teeth and the sun gear 32 has 48 teeth, then the latter will rotate 80/48=1⅔ times as fast, but opposite in sense from that of the internal gear 16.

B. *Forward motion in "emergency low" gear*

Figures 6, 7:
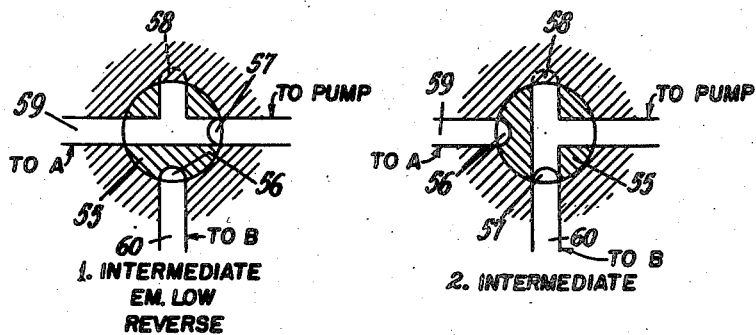
Figure 6 shows the valve setting when the transmission is operating in "1. Intermediate," or "Emergency Low," or "Reverse" gear ratio depending on additional conditions within the transmission.
Figure 7 shows the valve setting when the transmission is operating in "2. Intermediate" gear ratio.

To produce forward motion in "emergency low" gear the control lever is moved to the position "Em. Low" of Figure 9, i. e. the slidable brake member 47 will be shifted to the left to the extent that the brake teeth 53 will come within the reach of the brake teeth 41, but not of the brake teeth 35. The 3-way valve 55 is set as shown in Figure 6. The pressure fluid from the pump passes thru the valve 55 into the duct 59 and into the cylinder 19, actuating the pistons 18 and thereby the clutch A, driving the bevel gear 23. The bevel gear 36 serves as the reaction member, the brake teeth 41 being engaged with the stationary brake teeth 53 of the slidable brake member 47.

The driven shaft 42 will, therefore, rotate at reduced speed but increased torque, power being transmitted from the engine shaft 10 thru the impeller 11 to the runner 14 to the clutch A, to the bevel gear 23, to cluster bevel pinions 45 and 46 on the carrier 44 of the driven shaft 42. The bevel gear 24, planet pinions 30, sun gear 32 and internal gear 16 transmit no power, therefore rotate idly.

Assume that the bevel gear 36 has 48 teeth and the pinions 45 have 12 teeth and the gears 23 and 46 are of equal size, then for each revolution of the drive shaft 10 the driven shaft 42 will make ⅕ revolution, and the output torque is now five times greater than the input torque.

C. *Forward motion in "low" gear*

To produce forward motion in "low" gear, the control lever is moved to the position marked "Forward" of Figure 9, i. e. the slidable brake member 47 will be shifted further to the left to the extent that the brake teeth 53 will now also be within reach of the brake teeth 35. The 3-way valve 55 is set as shown in Figures 4 and 5.

The pump will discharge into the groove 56 and clutches A and B will be disengaged, fluid from the cylinders 19 and 28 will flow into grooves 57 and 58. Power will now be transmitted from the engine drive shaft 10 to the impeller 11 and thence will be transmitted to the runner 14 and internal gear 16. The sun gear 32 now serves as the reaction member, tending to rotate in the opposite sense from that of the internal gear 16, but its rotation will be prevented by the engagement of the brake teeth 35 with the teeth 53 of the stationary brake member 47. Increased torque (but at a reduced speed) will be transmitted by the carrier 29 thru the planetary rotation of the pinions 30 around the sun gear 32 to the bevel gear 24. Further torque multiplication and speed reduction takes place when the bevel gear 36 also tends to rotate in the reverse direction, but its rotation will be prevented by the engagement of the teeth 41 with the teeth 53 of the stationary brake member 47. This multiplied torque will be transmitted to the driven shaft 42 thru the planetary rotation of the pinions 45 around the now stationary bevel gear 36 and driven by the bevel gear 24.

As previously assumed the internal gear 16 has 80 teeth and the sun gear 32 has 48 teeth, the carrier 29 will, therefore, rotate at ⅝ of the speed of the internal gear 16, and the driven shaft 42 will then rotate at 1/16 of the speed of the input shaft 10 and the output torque will be 3.20 times greater than the input torque.

D. *Forward motion in "1. intermediate" gear*

To produce forward motion in "1. intermediate" gear the control lever remains in the position "Forward" of Figure 9; but the 3-way valve 55 is set as shown in Figure 6. The pump will discharge high pressure fluid into duct 59 and into the cylinders 19, actuating the pistons 18 and thereby the clutch A, driving the bevel gear 23.

The carrier 29 and bevel gear 24 continue to rotate at ⅝ of the speed of the input shaft 10, but the rotation of the bevel gear 23 at approximately the speed of the input shaft due to the engagement of the clutch A will cause the output shaft 42 to rotate at ½ of the speed of the input shaft 10 and the output torque will be two times the input torque.

The bevel gear 36 will now rotate in the same direction as the input shaft 10, but at ⅜ of that speed, the clutch teeth 41 will disengage from the teeth 53 due to the frictional oil drag contact of brake 41 with the bore of the hub 33, the multiple helical threads 40 will cause the brake 41 to move out of engagement with the teeth 53 of the stationary brake member 47, aided by the incline of the brake teeth as well.

It should be noted that the gear 23 transmits feed-back torque to the runner 14 of the hydraulic coupling thru the clutch A and hence to the internal gear 16, in other words, there is a circulating torque added to the engine torque and this combined torque is manifested at the internal gear 16.

Torque multiplication is effected by means of the reaction sun gear 32 and this multiplied torque is transmitted to the bevel gear 24 and then divided between the cluster bevel pinions 45 and 46, and the bevel gear 23, this latter torque being fed back thru the clutch A thru the runner 14 to the internal gear 16.

This feed-back torque is indicated by a small arrow in the tabulation of Figure 3.

E. *Forward motion in "2. intermediate" gear*

To produce forward motion in "2. intermediate" gear the control lever remains in the position "Forward" of Figure 9; but the 3-way valve 55 is set as shown in Figure 7. The clutch A is now disengaged, because the fluid in cylinders 19 may drain thru duct 59 into the drain groove 56. The pump discharges high pressure fluid into duct 60 and into the cylinders 28, actuating the pistons 27 and thereby engaging the clutch B, driving the bevel gear 36 at the same speed as the bevel gear 24, in other words, the bevel gear 24, cluster bevel pinions 45—46, bevel gears 36 and 23 will rotate as a unit at the speed of the bevel gear 24, which continues to rotate at ⅝ of the speed of the internal gear 16, but receives multiplied torque as long as the reaction sun gear 32 remains stationary, the brake teeth 35 continue their engagement with the brake teeth 53 of the stationary brake member 47.

The output shaft 42 now rotates at ⅝ of the speed of the input shaft 10 and the output torque will be 1.6 times greater than the input torque.

F. *Forward motion in "high" gear*

Figure 8:
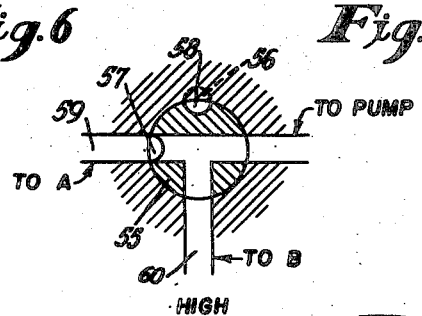
Figure 8 shows the valve setting when the transmission is operating in "High" gear ratio.

To produce forward motion in "high" gear the control lever remains in the position "Forward" of Figure 9; but the 3-way valve 55 is set as shown in Figure 8. The pump will deliver high pressure fluid into the ducts 59 and 60 and hence into cylinders 19 and 28, thereby actuating pistons 18 and 27 respectively and engage the clutches A and B.

Power is transmitted from the input shaft 10 to the impeller 11, thence to the runner 14 and clutch A, the latter driving the bevel gear 23. Clutch B locks bevel gears 24 and 36 together, compelling the cluster pinions 45—46 to rotate as a unit with the bevel gears 24 and 36. The pinions 45—46 being integral and as bevel gear 23 meshes with the pinion 46, there can no longer be any relative rotation of these gears and pinions, therefore, a direct drive from the input shaft 10 to the output shaft 42 is established. No power is transmitted thru the internal gear 16, planetary pinions 30 and sun gear 32, and the carrier 29 must now rotate at the speed of the runner 14 of the hydraulic coupling and, of course, that of the internal gear 16. It follows that the sun gear 32 is also compelled to rotate at the same speed, consequently the brake teeth 35 become disengaged from the teeth 53 of the stationary brake member 47.

The entire engine power is, therefore, transmitted directly to the output shaft 42 and all relative rotation between the gearing ceases and no torque multiplication takes place.

G. *"Reverse" operation*

To produce "reverse" motion of the vehicle the control lever is moved to the position "Reverse" of Figure 9; i. e. the slideable brake member 47 is moved to the extreme right in order to engage its brake teeth 51 with the brake teeth 31 on the carrier 29 of the intermediate floating assembly. In this position the brake teeth 53 are out of reach of the brake teeth 35 and 41.

Rotation of bevel gear 36 and sun gear 32 in a sense opposite to that of the drive shaft 10 is thereby permitted; motion of the brakes 35 and 41 to the right is limited by the shoulders 35a and 41a respectively. Rotation of the carrier 29 and bevel gear 24 being prevented, a setting of the 3-way valve 55 as shown in Figure 6 will pass high pressure fluid from the pump thru duct 59 to the cylinders 19 and actuate the pistons 18 and engage the clutch A and drive the bevel gear 23, causing the cluster bevel pinions 45—46 to planet around the stationary bevel gear 24 in a sense opposite to that of the bevel gear 23 but at a reduced speed and increased torque.

As previously assumed, the bevel gears 24 and 36 have 48 teeth and the pinions 45 have 12 teeth, and the bevel gears 23 and 46 are of equal size, then for each revolution of the bevel gear 23 the output shaft 42 will make ⅓ revolution in the opposite sense, i. e. it will move the vehicle in reverse.

The internal gear 16 will rotate the planet pinions 30 on the now stationary carrier 29, causing the sun gear 32 to rotate in the same direction as the output shaft. Similarly the bevel gear 36 will rotate in the same direction as the output shaft but at double the speed, thereby automatically rendering the "no-roll-back" one-way brake 61 ineffective in reverse operation.

Figure 2:
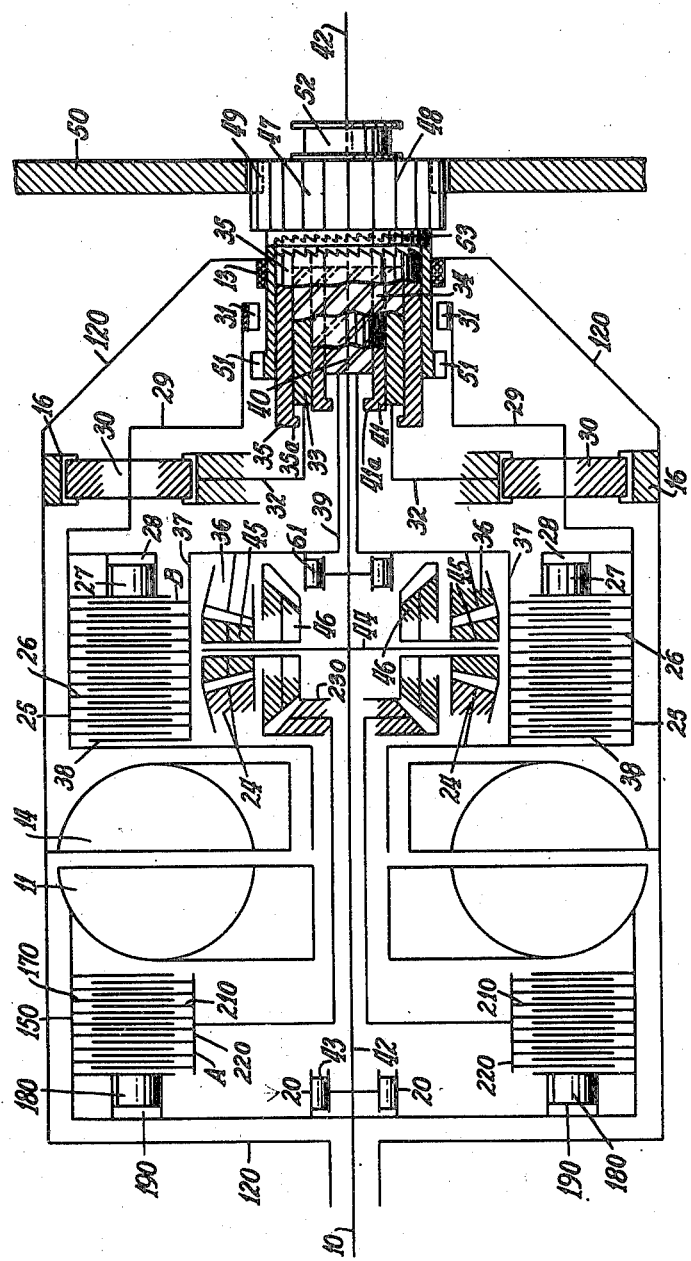
Figure 2 is a side elevational view in vertical longitudinal section of another form of the invention.

The construction shown in Figure 2 differs from that of Figure 1 in respect to clutch A only. In Figure 2 clutch A is connected to the impeller of the fluid coupling, whereas in Figure 1, the clutch A is connected to the runner of the fluid coupling. In Figure 2 corresponding parts of Figure 1 have been indicated by the same numerals multiplied by 10.

The speed ratios obtained with the construction of Figure 2 are identical with those of Figure 1. The same sequence and combination of clutch and brake engagements is used to obtain the various speed ratios.

In the construction of Figure 1 the entire engine torque is transmitted thru the fluid coupling in all 6 speed ratios as listed in the table of Figure 3, item 8, whereas the engine torque in the construction of Figure 2 is transmitted thru clutch A to the gear 230 in the emergency low, high and reverse gear ratios, and no torque whatever is imposed on the fluid coupling 11—14 in the above speed ratios. However, in the low and 2. intermediate gear ratios in the construction of Figure 2 the entire engine torque is transmitted thru the fluid coupling (as in Fig. 1) but in the 1. intermediate gear ratio the fluid coupling must transmit in addition to the engine torque the feed-back torque (item 11) from the bevel gear 230.

The tabulation of torque values of Figure 3 imposed on the various members of the transmission is based on an engine torque equal to 100 units, for all 6 possible speed ratios obtainable with this transmission.

From an inspection of the table, Figure 3, it can be seen that the construction of Figure 1 is to be preferred, because the entire engine torque is always transmitted thru the fluid coupling (item 8), thereby eliminating stalling of the engine.

I claim:

1. A variable speed transmission comprising in combination, a drive shaft, a driven shaft, a two element hydraulic coupling, one element of which is connected to the drive shaft, an internal gear connected to another element of the hydraulic coupling, a first reaction member including a sun gear and movable brake means cooperating therewith, a first planet pinion carrier, planet pinions on said carrier meshing with said internal gear and said sun gear, a first gear connected to said first planet pinion carrier, a second reaction member including a second gear and movable break means cooperating therewith, a second planet pinion carrier connected to the driven shaft, planet pinions on said second carrier meshing with said first and second gears, stationary brake means cooperating with the brake means of said first and second reaction members to prevent their rotation in a direction opposite to that of the drive shaft and thereby cause the driven shaft to rotate in the same direction as the drive shaft but at reduced speed and increased torque.

2. A variable speed transmission comprising in combination, a drive shaft, a driven shaft, a two element hydraulic coupling, one element of which is connected to the drive shaft, an internal gear connected to another element of the hydraulic coupling, a first reaction member including a sun gear and movable brake means cooperating therewith, a first planet pinion carrier, planet pinions on said carrier meshing with said internal gear and said sun gear, a first gear connected to said first planet pinion carrier, a second reaction member including a second gear and movable brake means cooperating therewith, a second planet pinion carrier connected to the driven shaft, planet pinions on said second carrier meshing with said first and second gears, slideably positioned stationary brake means co-operating with the brake means of said first and second reaction members to prevent their rotation in a direction opposite to that of the drive shaft and thereby cause the driven shaft to rotate in the same direction as the drive shaft but at reduced speed and increased torque.

3. A variable speed transmission comprising in combination, a drive shaft, a driven shaft, a two element hydraulic coupling, one element of which is connected to the drive shaft, an internal gear connected to another element of the hydraulic coupling, a first reaction member including a sun gear and slideable brake means cooperating therewith, a first planet pinion carrier, planet pinions on said carrier meshing with said internal gear and said sun gear, clutch means and clutch actuating means on said first carrier, a first bevel gear connected to said first planet pinion carrier, a second reaction member including a second bevel gear with helical grooves thereon, and slideable brake means cooperating therewith and clutch means for cooperation with the clutch means on said first carrier, a second planet pinion carrier connected to the driven shaft, planet pinions on said second carrier meshing with said first and second bevel gears, slideably positioned stationary brake means cooperating with the brake means of said first and second reaction members to prevent their rotation in a direction opposite to that of the drive shaft, so that when the clutch means are disengaged the driven shaft will rotate in the same direction as the drive shaft but at reduced speed and increased torque, and when the clutch means are engaged the driven shaft will rotate at a different speed ratio, whereby the brake means of the second reaction member disengages from the stationary brake means.

4. A variable speed transmission comprising in combination, a drive shaft, a driven shaft, a two element hydraulic coupling, one element of which is connected to the drive shaft, an internal gear connected to another element of the hydraulic coupling, a first reaction member including a sun gear with helical grooves and slideable brake means cooperating therewith, a first planet pinion carrier, planet pinions on said carrier meshing with said internal gear and said sun gear, a first bevel gear connected to said first planet pinion carrier, a second reaction member including a second bevel gear with helical grooves thereon and slideable brake means cooperating therewith, a third bevel gear including clutch means, clutch means and clutch operating means on one element of the hydraulic coupling for cooperation with the clutch means of the third bevel gear, a second planet pinion carrier connected to the driven shaft, compound planet pinions on said second carrier meshing with the first, second and third bevel gears, stationary brake means slidable into definite positions for cooperation with the brake means of said first and second reaction members to prevent their rotation in a direction opposite to that of the drive shaft, so that when the clutch means are engaged the driven shaft will rotate in the same direction as the drive shaft but at different speed ratios determined by the position of the stationary brake means.

5. A variable speed transmission comprising in combination, a drive shaft, a driven shaft, a two element hydraulic coupling, one element of which is connected to the drive shaft, an internal gear connected to another element of the hydraulic coupling, slideably positioned stationary brake means, a first reaction member including a sun gear with helical grooves and slideable brake means thereon for cooperation with the stationary brake means, a first planet pinion carrier, planet pinions on said carrier meshing with said internal gear and said sun gear, clutch means and clutch operating means on said first carrier, a first bevel gear connected to said first planet pinion carrier, a second reaction member including a second bevel gear with helical grooves and slideable brake means thereon for cooperation with the stationary brake means and clutch means for co-operation with the clutch means of said first carrier, a third bevel gear including clutch means, clutch means and clutch operating means on one element of the hydraulic coupling for cooperation with the clutch means of the third bevel gear, a second planet pinion carrier connected to the driven shaft, compound planet pinions on said second carrier meshing with the first, second and third bevel gears, so that when both clutches are engaged all brake means will become disengaged and the driven shaft will rotate in the same direction and practically at the same speed as the drive shaft.

6. A variable speed transmission comprising in combination, a drive shaft, a driven shaft, a two element hydraulic coupling, one element of which is connected to the drive shaft, an internal gear connected to the other element of the hydraulic coupling, slideably positioned stationary brake means, a first reaction member including a sun gear with helical grooves and slideable brake means thereon for cooperation with the stationary brake means, a first planet pinion carrier, planet pinions on said carrier meshing with said internal gear and said sun gear, clutch means and clutch operating means on said first carrier, a first bevel gear connected to said first planet pinion carrier, a second reaction member including a second bevel gear with helical grooves and slideable brake means thereon for cooperation with the stationary brake means and clutch means for cooperation with the clutch means of the first carrier, a third bevel gear including clutch means, clutch means and clutch operating means on one element of the hydraulic coupling for cooperation with the clutch means of the third bevel gear, a second planet pinion carrier connected to the driven shaft, compound planet pinions on said second carrier meshing with the first, second and third bevel gears, so that when either one or both clutch means are engaged the driven shaft will rotate in the same direction as the drive shaft, but at different speed ratios depending upon the position of the stationary brake means.

7. A variable speed transmission comprising in combination, a drive shaft, a driven shaft, a two element hydraulic coupling, one element of which is connected to the drive shaft, an internal gear connected to another element of the hydraulic coupling, slideably positioned stationary brake means, a first reaction member including a sun gear with helical grooves and slideable brake means thereon for cooperation with the stationary brake means, a first planet pinion carrier, planet pinions on said carrier meshing with said internal gear and said sun gear, a first bevel gear connected to said first planet pinion carrier, a second reaction member including a second bevel gear with helical grooves and slideable brake means thereon for cooperation with the stationary brake means, a third bevel gear including clutch means, clutch means and clutch actuating means on one element of the hydraulic coupling for cooperation with the clutch means of the third bevel gear, a second planet pinion carrier connected to the driven shaft, compound planet pinions on said second carrier meshing with the first, second and third bevel gears, brake means on said first planet pinion carrier, whereby the slideably positioned stationary brake means cooperates with the brake means of both reaction members or only with the brake means of the first planet pinion carrier depending upon the position of the stationary brake means, for forward or reverse operation of the driven shaft respectively.

8. A variable speed transmission comprising in combination, a drive shaft, a driven shaft, a two element hydraulic coupling, one element of which is connected to the drive shaft, an internal gear connected to another element of the hydraulic coupling, slideably positioned stationary brake means, a first reaction member including a sun gear with helical grooves and slideable brake means thereon for cooperation with the stationary brake means, a first planet pinion carrier, planet pinions on said carrier meshing with said internal gear and said sun gear, clutch means and clutch actuating means on said first carrier, a first bevel gear connected to said first planet pinion carrier, a second reaction member including a second bevel gear with helical grooves and slideable brake means thereon and clutch means for cooperation with the stationary brake means and the clutch means of said first carrier respectively, a third bevel gear including clutch means, clutch means and clutch actuating means on one element of the hydraulic coupling for cooperation with the clutch means of the third bevel gear, a second planet pinion carrier connected to the driven shaft, compound planet pinions on said second carrier meshing with the first, second and third bevel gears, brake means on said first planet pinion carrier, whereby the slideably positioned stationary brake means cooperates with the brake means of both reaction members or only with brake means of the first planet pinion carrier depending upon the position of the stationary brake means for forward or reverse operation of the driven shaft respectively.

9. A variable speed transmission comprising in combination, a drive shaft, a driven shaft, a two element hydraulic coupling, one element of which is connected to the drive shaft, an internal gear connected to another element of the hydraulic coupling, slideably positioned stationary brake means, a first reaction member including a sun gear with helical grooves and slideable brake means thereon, a first planet pinion carrier, planet pinions on said carrier meshing with said internal gear and said sun gear, a first bevel gear connected to said first planet pinion carrier, a second reaction member including a second bevel gear with helical grooves and slideable brake means thereon, a second planet pinion carrier connected to the driven shaft, planet pinions on said second carrier meshing with said first and second bevel gears, whereby the slideably positioned stationary brake means, in a first position, cooperates with the brake means of the first and second reaction members, in a second position, cooperates with the brake means of the second reaction member only, and in a third position, fails to contact the brake means of both reaction members for neutral operation of the transmission.

10. A variable speed transmission comprising in combination, a drive shaft, a driven shaft, a two element hydraulic coupling, one element of which is connected to the drive shaft, an internal gear connected to another element of the hydraulic coupling, a slideably positioned stationary brake means, a first reaction member including a sun gear with helical grooves and slideable brake means thereon, a first planet pinion carrier with brake means, planet pinions on said carrier meshing with said internal gear and said sun gear, a first bevel gear connected to said first planet pinion carrier, a second reaction member including a second bevel gear with helical grooves and slideable brake means, a second planet pinion carrier connected to the driven shaft, planet pinions on said second carrier meshing with said first and second bevel gears, whereby the slideably positioned stationary brake means, in a first position, cooperates with the brake means of the first and second reaction members, in a second position, with the brake means of the second reaction member only, and in a third position, fails to contact the brake means of both reaction members, and in a fourth position, cooperates with the brake means of said first carrier.

11. A variable speed transmission comprising in combination, a drive shaft, a driven shaft, a two element hydraulic coupling, one element of which is connected to the drive shaft, an internal gear connected to the other element of the hydraulic coupling, slideably positioned stationary brake means, a first reaction member including a sun gear with helical grooves and slideable brake means thereon, a first planet pinion carrier with brake means, planet pinions on said carrier meshing with said internal gear and said sun gear, clutch means and clutch actuating means on said first carrier, a first bevel gear connected to said first planet pinion carrier, a second reaction member including a second bevel gear with helical grooves and slideable brake means thereon and clutch means for cooperation with the clutch means of said first carrier, a third bevel gear including clutch means, clutch means and clutch actuating means on one element of the hydraulic coupling to couple with the clutch means of the third bevel gear, a second planet pinion carrier connected to the driven shaft, compound planet pinions on said second carrier meshing with the first, second and third bevel gears, whereby the slideably positioned stationary brake means, in a first position, cooperates with the brake means of the first and second reaction members to prevent their rotation in a direction opposite to that of the drive shaft, and in second position, cooperates with the brake means of the second reaction member only, and in a third position, fails to contact the brake means of both reaction members, and in a fourth position, cooperates with the brake means of said first carrier.

12. The combination set forth in claim 11 in which roller brake means are provided between the second bevel gear and the driven shaft to prevent the driven shaft from rotating in a direction opposite to that of the drive shaft when the slideably positioned brake means is in its first and second positions, and said roller brake means is rendered automatically inoperative when the slideably positioned brake means is in its third and fourth positions.

13. A variable speed transmission comprising in combination, a drive shaft, a driven shaft, a two element hydraulic coupling, one element of which is connected to the drive shaft, an internal gear connected to another element of the hydraulic coupling, slideably positioned stationary brake means, a first reaction member including a sun gear with helical grooves and slideable brake means thereon, a first planet pinion carrier, planet pinions on said carrier meshing with said internal gear and said sun gear, a first bevel gear connected to said first planet pinion carrier, a second reaction member including a second bevel gear with helical grooves and slideable brake means thereon, a second planet pinion carrier connected to the driven shaft, planet pinions on said second carrier meshing with said first and second bevel gears, whereby the slideably positioned stationary brake means cooperates with the brake means of the first and second reaction members to prevent their rotation in a direction opposite to that of the drive shaft, and roller brake means between the second bevel gear and the driven shaft to prevent the driven shaft from rotating in a direction opposite to that of the drive shaft.

14. A variable speed transmission comprising in combination, a drive shaft, a driven shaft, a two element hydraulic coupling, one element of which is connected to the drive shaft, an internal gear connected to another element of the hydraulic coupling, slidably positioned stationary brake means, a first reaction member including a sun gear with helical grooves and slideable brake means thereon, a first planet pinion carrier, planet pinions on said carrier meshing with said internal gear and said sun gear, a first bevel gear connected to said first planet pinion carrier, a second reaction member including a second bevel gear with helical grooves and slideable brake means thereon, a second planet pinion carrier connected to the driven shaft, planet pinions on said second carrier meshing with said first and second bevel gears, whereby the slideably positioned stationary brake means cooperates with the brake means of the first and second reaction members to prevent their rotation in a direction opposite to that of the drive shaft, and roller brake means between the drive shaft and the driven shaft to prevent the driven shaft from over-running the drive shaft.

15. A variable speed transmission comprising in combination, a drive shaft, a driven shaft, a two element hydraulic coupling, one element of which is connected to the drive shaft, an internal gear connected to the other element of the hydraulic coupling, slidably positioned stationary brake means, a first reaction member including a sun gear with helical grooves and slideable brake means thereon, a first pinion carrier with brake means, planet pinions on said carrier meshing with said internal gear and said sun gear, clutch means on said first carrier, a source of pressure fluid, a three-way valve, fluid ducts, clutch actuating means on said first carrier conditioned by said pressure fluid flowing thru said valve and ducts, a first bevel gear connected to said first planet pinion carrier, a second reaction member including a second bevel gear with helical grooves and slideable brake means thereon and clutch means for cooperation with the clutch means of said first carrier, a third bevel gear including clutch means, clutch means on one element of the hydraulic coupling, clutch actuating means thereon conditioned by said pressure fluid flowing thru said valve and ducts, to connect with the clutch means of the third bevel gear, a second planet pinion carrier connected to the driven shaft, compound planet pinions on said second carrier meshing with the first, second and third bevel gears, whereby the slideably positioned stationary brake means which in a first position, cooperates with the brake means of the first and second reaction members to prevent their rotation in a direction opposite to that of the drive shaft, and in a second position, cooperates with the brake means of the second reaction member only, and in a third position, fails to contact the brake means of both reaction members, and in a fourth position, cooperates with the brake means of said first carrier.

16. A variable speed transmission comprising in combination, a drive shaft, a driven shaft, a two element hydraulic coupling, one element of which is connected to the drive shaft, an internal gear connected to the other element of the hydraulic coupling, slidably positioned stationary brake means, a first reaction member including a sun gear with helical grooves and slideable brake means thereon, a first planet pinion carrier, planet pinions on said carrier meshing with said internal gear and said sun gear, clutch means and clutch actuating means on said first carrier, a first bevel gear connected to said first planet pinion carrier, a second reaction member including a second bevel gear with helical grooves and slideable brake means thereon and clutch means for cooperation with the clutch means of said first carrier, a third bevel gear including clutch means, clutch means and clutch operating means on one element of the hydraulic coupling for cooperation with the clutch means of the third bevel gear, a second planet pinion carrier connected to the driven shaft, compound planet pinions on said second carrier meshing with the first, second and third bevel gears, the slideably positioned stationary brake means provides a bearing for the slideable brake means of said first reaction member, said sun gear provides a bearing for the slideable brake means of the second reaction member, said slideable brake means comprising each an internally helical grooved, hollow cylinder, one end of which is provided with ratchet teeth suitable for cooperation with the stationary brake means, said hollow cylinders being telescoped and in frictional contact with their immediate bearing, whereby said frictional contact acts to disengage the slideable brake members from the stationary brake means when the reaction members tend to rotate in the same direction as the drive shaft, when either or both clutch means are engaged.

17. A variable speed transmission comprising in combination, a drive shaft, a driven shaft, a two element hydraulic coupling, one element of which is connected to the drive shaft, an internal gear connected to the other element of the hydraulic coupling, slidably positioned stationary brake means, a first reaction member including a sun gear with helical grooves and slideable brake means thereon, a first planet pinion carrier with brake means to cooperate with said stationary brake means, planet pinions on said carrier meshing with said internal gear and said sun gear, clutch means and clutch actuating means on said first carrier, a first bevel gear connected to said first planet pinion carrier, a second reaction member including a second bevel gear with helical grooves and slideable brake means thereon and clutch means for cooperation with the clutch means of said first carrier, a third bevel gear including clutch means, clutch means and clutch operating means one one element of the hydraulic coupling for cooperation with the clutch means of the third bevel gear, a second planet pinion carrier connected to the driven shaft, compound planet pinions on said second carrier meshing with the first, second and third bevel gears, said slideably positioned stationary brake means provides a bearing for the slideable brake means of said first reaction member, said sun gear provides a bearing for the slideable brake means of the second reaction member, the said slidable brake means comprising each an internally helical grooved, hollow cylinder, one end of which is provided with ratchet teeth suitable for cooperation with the stationary brake means, said hollow cylinders being telescoped and in frictional contact with their immediate bearing, whereby said frictional contact acts to disengage the slideable brake means from the stationary brake means when the reaction members tend to rotate in the same direction as the drive shaft, when either or both clutch means are engaged.

18. Variable speed ratio transmission mechanism for motor vehicles comprising in combination, an input and an output shaft, two planetary gear sets each having input, output and reaction members, said reaction members being provided with helical groove controlled brake means, brake means and clutch coupling means associated with the output member of the first planetary gear set and the reaction member of the second planetary gear set, a two element hydraulic coupling connection between the drive shaft and the input member of the first planetary gear set, clutch coupling means associated with the input member of the second planetary gear set and one element of the hydraulic coupling, slideably positioned stationary brake means cooperating with the brake means of said reaction members to prevent their rotation in a direction opposite to that of the drive shaft and with the brake means of the first planetary gear set, and fluid controlled means for energizing the clutch coupling means to produce forward or reverse operation of the driven shaft, whereby said reaction members become automatically disengaged from the stationary brake means when said reaction members are compelled to rotate in the same direction as the drive shaft upon engagement of said clutch coupling means.

19. Variable speed transmission mechanism for motor vehicles comprising in combination, a drive shaft and a driven shaft, two variable speed ratio planetary gear sets, a two element hydraulic coupling connection between one of the variable speed ratio planetary gear sets and the drive shaft, slideably positioned stationary brake means, reaction and helical groove controlled brake members associated with said gear sets and cooperating with the stationary brake means, clutch coupling means between the two planetary gear sets, clutch coupling means between one element of the hydraulic coupling and one of the gear sets, fluid control and actuating means for said clutch coupling means, whereby said gear sets may be coupled to transmit engine or multiplied torque from the drive shaft to the driven shaft, said reaction members becoming automatically disengaged from the stationary brake means when said reaction members are compelled to rotate in the same direction as the drive shaft upon engagement of one or both clutch coupling means.

20. The combination set forth in claim 19 in which roller brake means between the driven shaft and one of the reaction members are provided to prevent the driven shaft from rotating in a direction opposite to that of the drive shaft, and roller brake means are provided between the driven shaft and the drive shaft to prevent the driven shaft from rotating faster than the drive shaft.

FREDERICK W. SEYBOLD.

REFERENCES CITED

The following references are of record in the file of this patent:

UNITED STATES PATENTS

| Number | Name | Date |
|---|---|---|
| 2,366,063 | Seybold | Dec. 26, 1944 |
| 2,406,225 | Kelbel | Aug. 20, 1946 |